(12) United States Patent
Menke

(10) Patent No.: US 7,131,757 B2
(45) Date of Patent: Nov. 7, 2006

(54) HOLDER AND HEAT SINK FOR HIGH PERFORMANCE LIGHT EMITTING DIODE WARNING LIGHT ASSEMBLY

(75) Inventor: W. Kenneth Menke, Glendale, MO (US)

(73) Assignee: The Fire Products Company, St. Louis, MO (US)

( * ) Notice: Subject to any disclaimer, the term of this patent is extended or adjusted under 35 U.S.C. 154(b) by 133 days.

(21) Appl. No.: 10/713,308

(22) Filed: Nov. 14, 2003

(65) Prior Publication Data

US 2005/0117365 A1  Jun. 2, 2005

(51) Int. Cl.
*B60Q 1/26* (2006.01)

(52) U.S. Cl. .............. 362/542; 362/241; 362/306; 362/440; 362/545

(58) Field of Classification Search ............. 362/35, 362/227, 237, 240–241, 249, 294, 306, 433, 362/440, 542, 544–547
See application file for complete search history.

(56) References Cited

U.S. PATENT DOCUMENTS

| | | | |
|---|---|---|---|
| 2,814,029 A | 11/1957 | McRea | |
| 3,271,735 A * | 9/1966 | Gosswiller | 340/473 |
| 3,375,368 A * | 3/1968 | Dorsky | 362/306 |
| 3,851,165 A * | 11/1974 | Beck et al. | 362/268 |
| 4,124,880 A * | 11/1978 | Dart et al. | 362/35 |
| 4,210,954 A * | 7/1980 | Laser | 362/303 |
| 4,430,696 A * | 2/1984 | Lemcke | 362/306 |
| 5,072,349 A * | 12/1991 | Waniga | 362/238 |
| 5,215,371 A * | 6/1993 | Pileski | 362/306 |
| 6,030,102 A * | 2/2000 | Gromotka | 362/365 |
| 6,081,191 A | 6/2000 | Green et al. | |
| RE36,790 E | 7/2000 | Jincks et al. | |
| 6,247,832 B1 | 6/2001 | Neustadt | |
| 6,271,630 B1 | 8/2001 | Yahraus | |
| 6,283,613 B1* | 9/2001 | Schaffer | 362/245 |
| 6,318,886 B1 | 11/2001 | Stopa et al. | |
| 6,367,949 B1 | 4/2002 | Pederson | |
| 6,461,008 B1 | 10/2002 | Pederson | |
| 6,461,009 B1 | 10/2002 | Smith | |
| 6,547,410 B1 | 4/2003 | Pederson | |
| 6,641,284 B1* | 11/2003 | Stopa et al. | 362/240 |
| 2002/0036908 A1 | 3/2002 | Pederson | |
| 2003/0021121 A1 | 1/2003 | Pederson | |
| 2003/0031028 A1 | 2/2003 | Murray et al. | |

* cited by examiner

*Primary Examiner*—Renee Luebke
*Assistant Examiner*—Adam C. Rehm
(74) *Attorney, Agent, or Firm*—Thomson Coburn, LLP

(57) ABSTRACT

A signal light supporting apparatus for emergency vehicle warning signal lights employing light emitting diodes provides a secure and removable mounting for one or more of the light emitting diodes and an optic of each light emitting diode to a support casing that functions as a heat sink.

19 Claims, 3 Drawing Sheets

HOLDER AND HEAT SINK FOR HIGH PERFORMANCE LIGHT EMITTING DIODE WARNING LIGHT ASSEMBLY

BACKGROUND OF THE INVENTION (1) Field of the Invention

The present invention pertains to a supporting holder and heat sink for high performance, light emitting diode warning lights. In particular, the present invention pertains to a support casing for light emitting diode warning lights and their optics, where the light emitting diodes and optics are removably held to the support casing by a spring brace and where the support casing functions as a heat sink for the light emitting diodes.

(2) Description of the Related Art

Since the invention of the rotating beacon in the 1940's, a large number of emergency and service vehicles have been protected by warning lights that use an incandescent lamp. In these systems, the lamp is given the appearance of flashing by a rotating reflector positioned in the warning light. The reflector is rotated about the lamp and produces a rotating, reflected arc of coverage and a level of warning within a specified zone around the vehicle.

More recently, emergency and service vehicles have employed warning signal lights comprising light emitting diodes (LEDs). In most emergency warning light applications employing LEDs, it is necessary to use an optic placed in front of the LED. The optic, typically a lens and reflector, focuses the light output of the LED and concentrates and directs the light output into the particular area needed to provide visual protection to the emergency vehicle. Therefore, a typical emergency warning light assembly is comprised of a mounting structure, the LED, and the optic in proper alignment.

At the present time, some of the highest performance, commercially available light emitting diodes are built on circuit boards incorporating an aluminum base. The aluminum base permits cooling of the LED chip by conduction of the heat generated by the LED chip through the aluminum base to a metallic mounting structure. LED assemblies of this type are commonly called "stars" because of the star shape of the aluminum base. The cooling of the LED chip is critical to the operation of the emergency warning light because the light output of the LED is substantially reduced as the temperature of the LED chip increases. In addition, the LED chip could suffer terminal failure at about 105° C.

Since the beginning of the use of light emitting diodes in emergency vehicle warning lights, their performance has continuously improved and is currently at or above 55 lumens per watt for colors such as red-orange. It has been observed that, given the forward voltage requirement of about 3 volts per LED and the voltage drop through the control electronics of a typical warning signal light, a string of LEDs in series is typically used to achieve maximum electrical efficiency on a 12 volt automotive electrical system. LEDs with a 1-watt rating typically operate at 350 milliamps. Thus, in a 12-volt automotive electrical system, the same electrical energy is required to operate one LED, two LEDs connected in series, or three LEDs connected in series. For emergency vehicle applications, it is therefore desirable to employ two or three LEDs connected in series in the warning signal lights of the vehicle. However, with the LEDs connected in series, if one of the LEDs goes out, the other LEDs go out as well. Given the substantial cost of each LED, currently between $5.00 and $10.00 apiece, it is very desirable to be able to replace, in the field, a single failed LED of a series string of LEDs in an emergency vehicle warning signal light.

SUMMARY OF THE INVENTION

The present invention overcomes the disadvantages associated with emergency vehicle warning signal lights employing two, three, or more LEDs by providing a signal light supporting apparatus that enables easy replacement of failed LEDs while also functioning as a heat sink for the LEDs.

The signal light supporting apparatus provides a secure mounting for one or more of the LEDs, and provides a secure, removable attachment of an optic to each of the individual LEDs. The supporting apparatus functions as a thermally conductive path for the individual LEDs to dissipate the heat generated by the LEDs, and thereby maximize the light output and prevents the failure of the LEDs caused by excessive heat. A removable attachment of the LEDs and their optics to the light supporting apparatus permits the easy replacement of individual LEDs should one fail when the other LEDs in the series connection have not failed.

The signal light supporting apparatus of the invention is basically comprised of one or more support casings, one or more electronic circuit members having an LED, an optic for the LED of each electronic circuit member, and a spring brace for each optic and electronic circuit member that removably holds the optic and electronic circuit member to the support casing.

The preferred embodiment of the signal light supporting apparatus employs two support casings. However, other numbers of support casings could be used. The support casing is constructed of a thermally conductive material, for example a metal. It has an elongate configuration with a rectangular rear wall. A pair of side walls project outwardly from opposite side edges of the rear wall, defining a spacing between the side walls and in front of the rear wall. Each of the side walls projects outwardly from the rear wall to a forward edge of the side wall. A plurality of notches are formed in the forward edges of the side walls. The notches of the two side walls are positioned opposite each other. Holes are provided in the side walls adjacent the notches. Pluralities of posts also project outwardly from the rear wall. The posts are arranged in pairs that are centered between the pairs of side wall notches.

When two support casings are employed in the signal light supporting apparatus, a back plate connects the rear walls of the two support casings with the side walls of the two support casings being positioned parallel to each other. However, other arrangements of multiple support casings could be used.

One or more electronic circuit members, each having an LED, is mounted to the rear wall of the support casing. In the preferred embodiment, the electronic circuit member is a "star" type member described earlier, that comprises an LED chip with a metallic mounting base having a star shape. The electronic circuit members are electrically connected in series. Each of the electronic circuit members is removably mounted to the support casing rear wall by being inserted between and engaging between a pair of the posts that project from the rear wall.

One or more optics are mounted to the support casing. The number of optics depends on the number of LEDs mounted to the support casing. Each of the optics has a general conical shape. A small, recessed concave surface at the apex of each conically shaped optic is positioned against the convex surface of the light emitting diode of each electronic circuit member. The circular base of the conically shaped optic is received in a pair of opposed notches in the forward edges of the support casing side walls. This properly orients the optic for focusing and projecting the light of the LED outwardly from the support casing.

A spring brace is employed to removably hold each optic and its associated electronic circuit member to the support casing. The number of spring braces employed corresponds to the number of optics and LED electronic circuit members employed. The spring base is a wire spring having a general U-shaped configuration with opposite ends and a small center projection bent into the middle of the U-shaped spring. The spring brace is removably attached to the support casing by positioning the center projection in the concavity of the optic, and positioning the opposite ends of the spring in a pair of holes in the opposite side walls of the support casing. With the spring brace removably holding the optic against the electronic circuit member and holding the electronic circuit member against the rear wall of the support casing, the heat generated by the LED of the electronic circuit member is dissipated through the support casing. In addition, should one of the LEDs fail, the electronic circuit member of the failed LED is easily removed from the support casing by disengaging the opposite ends of the spring brace from their engagement in the holes in the side walls of the support casing and removing the spring brace, the optic and the failed electronic circuit member from the support casing.

BRIEF DESCRIPTION OF THE DRAWING FIGURES

Further features of the invention are set forth in the following detailed description of the preferred embodiment of the invention and in the drawing figures wherein.

DETAILED DESCRIPTION OF A PREFERRED EMBODIMENT

Figure 1:
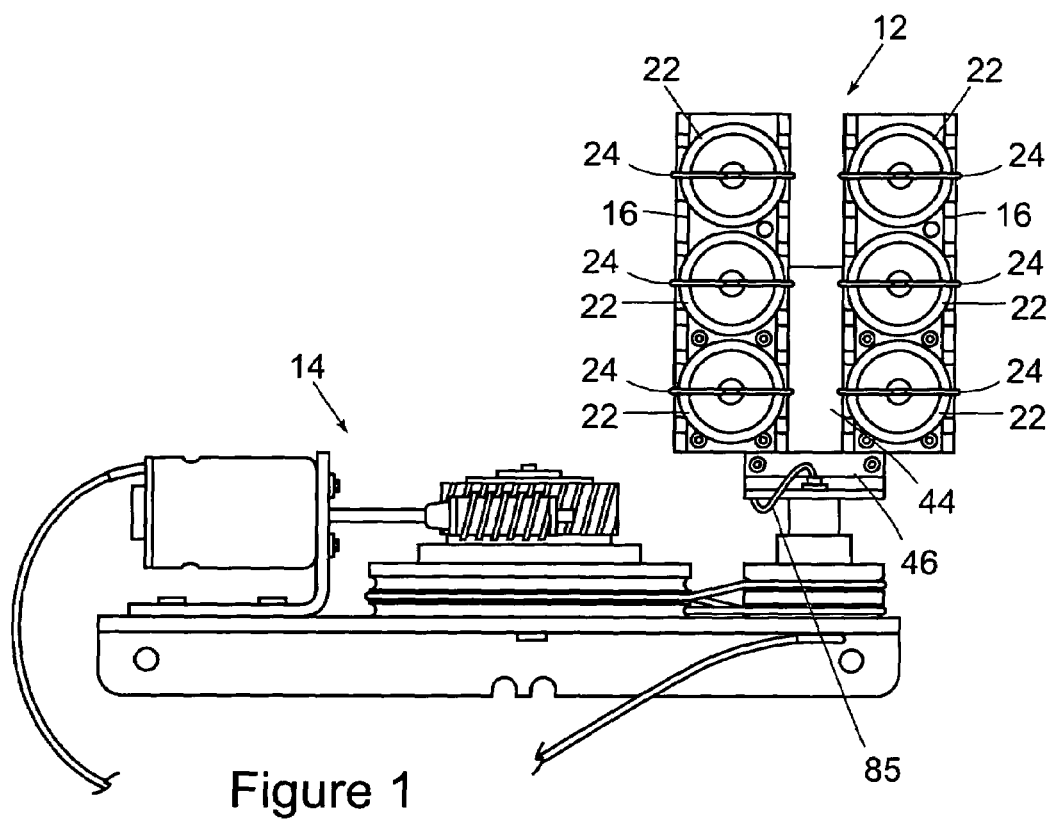
FIG. 1 is a front elevation view of the signal light supporting apparatus of the invention mounted to a motive source that oscillates the apparatus.

FIG. 1 shows the apparatus of the present invention 12 mounted on a motive source 14. The motive source shown is only one example of a motive source that may be used with the apparatus of the invention. The motive source 14 is of a type disclosed in the U.S. patent of W. Kenneth Menke, Pat. No. 5,842,768, titled Signal Light Oscillating Mechanism. This type of motive source 14 oscillates the apparatus of the invention 12 through an arc of movement. Again, other types of motive sources may be employed with the apparatus 12.

The signal light supporting apparatus 12 of the invention is basically comprised of one or more support casings 16, one or more electronic circuit members 18 each having an LED, an optic 22 for the LED of each of the electronic circuit members, and a spring brace 24 for each of the optics 22 and circuit members 18.

In the preferred embodiment of the signal light supporting apparatus 12, two support casings 16 are employed. The two support casings 16 are identical to each other. However, in other applications, one support casing could be used, or three or more support casings could be used.

Figure 2:
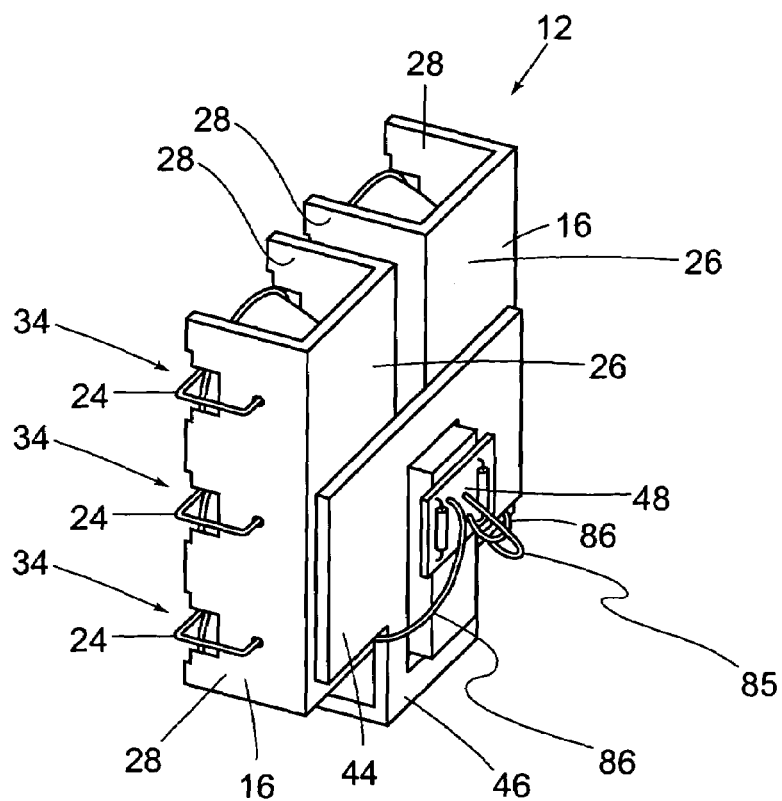
FIG. 2 is a rear perspective view of the apparatus removed from the motive source of FIG. 1.
Figure 3:
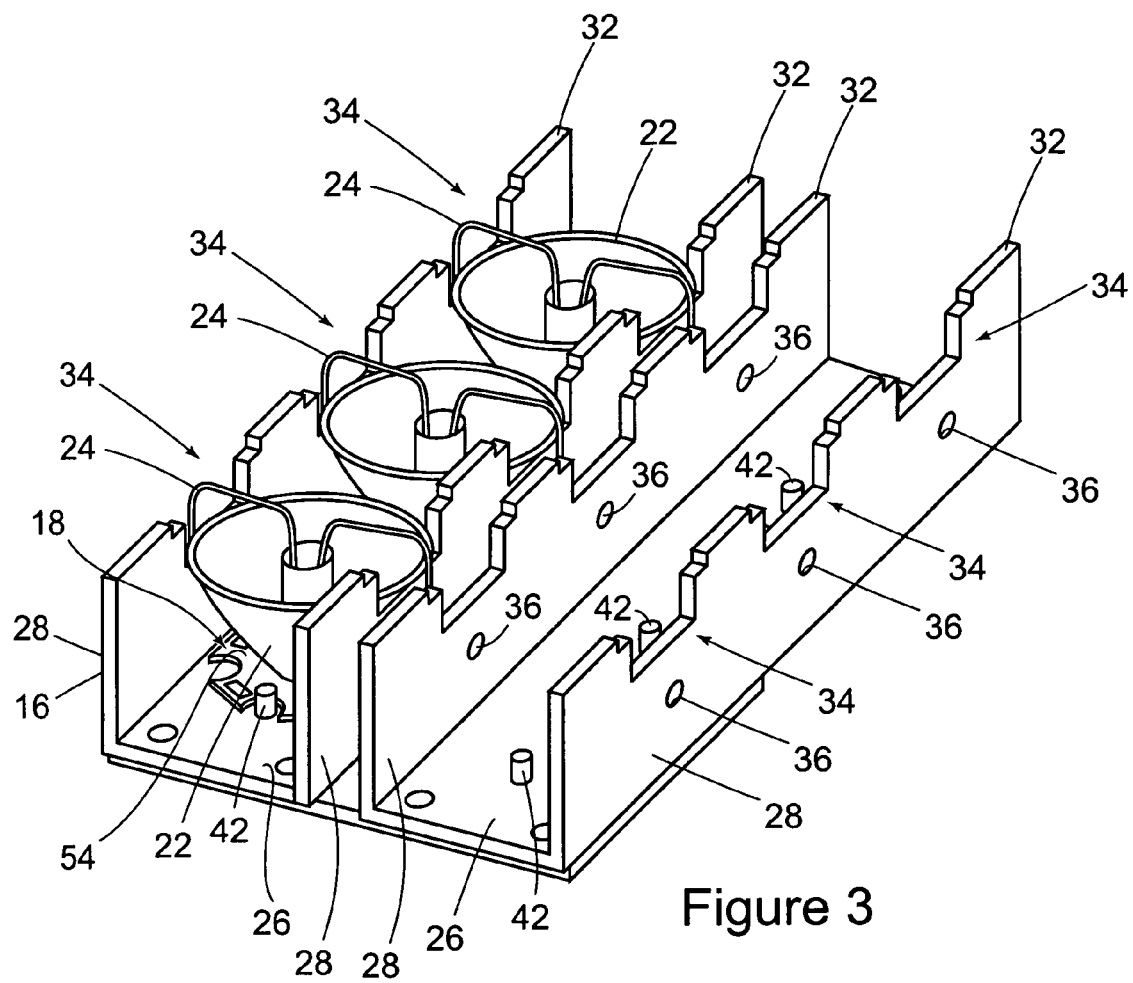
FIG. 3 is a front perspective view of the apparatus with several of the LED assemblies disassembled from the holder.
Figure 4:
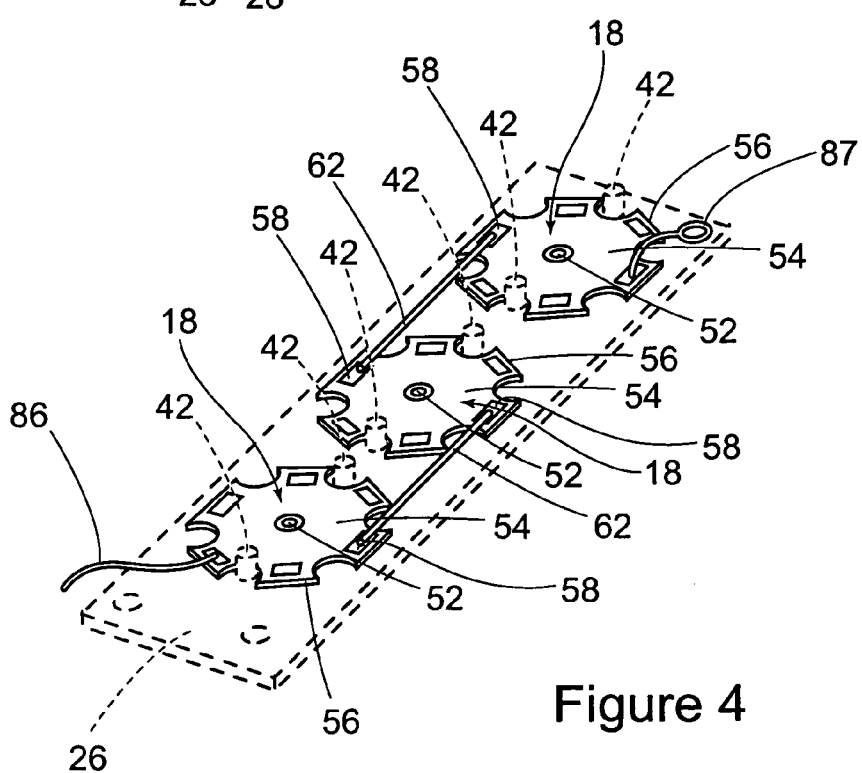
FIG. 4 is a perspective view of the electronic circuit members of the LED assemblies.

As best seen in FIGS. 2 and 3, each support casing has an elongate configuration with a rectangular rear wall 26 and a pair of side walls 28, 32. The rear wall 26 and side walls 28, 32 are all constructed of a thermally conductive material, for example, aluminum. The pair of side walls 28 are parallel to each other and project outwardly from opposite side edges of the rear wall 26 to forward edges 32 of the side walls.

Notches 34 are formed into each of the forward edges 32 of the side walls 28. As best seen in FIG. 3, the notches 34 are arranged in pairs in the side wall forward edges 32 on opposite sides of the rear wall 26.

Holes 36 are formed in each of the side walls 28 adjacent the notches 34. The holes 36 are arranged in pairs on opposite sides of the rear wall 26 and are centered relative to their adjacent notches 34.

Pairs of post 42 project outwardly from the rear wall 26. The pairs of post 42 are arranged in a line that extends along the length of the rear wall 26. Each pair of posts 42 is centered on the rear wall between each of the pairs of notches 34 in the support casing side walls 28.

The two support casings 16 of the apparatus 12 shown in FIGS. 1–3 and 7 are secured together by a back plate 44 that is connected to the rear walls 26 of the two casings. The back plate 44 holds the pairs of side walls 28 of the two support casings 16 in a parallel relationship to each other. A bracket 46 projects downwardly and forwardly from the back plate 44. The bracket 46 is employed in mounting the apparatus 12 to the motive source 14 described earlier. As shown in FIG. 2, the back plate 44 also supports an electronic circuit board 48 that controls the electrical current supplied to the signal lights of the apparatus. Unregulated electrical power is supplied to the circuit board 48 through wire 85 and regulated current is supplied to the series string of electronic circuit members 18 through wires 86.

The side by side positioning of the support casings 16 shown in FIGS. 1–3 and 7 is only one example of the possible relative positions of the support casings 16. In addition, as explained earlier, more than the two support casings 16 shown in the drawing Figures may be employed in a signal light supporting apparatus, with the support casings 16 being positioned in a variety of different relative positions.

One or more of the electronic circuit members 18 are removably mounted to the rear wall 26 of the support casing 16. In the embodiment shown in the drawing figures, three electronic circuit members 18 are mounted to the rear wall 26. Each electronic circuit member 18 is a "star" type circuit member described earlier. Each of the electronic circuit members 18 has a light emitting diode (LED) 52 at its center. The LED has a slightly convex surface. The metallic mounting base 54 has a plurality of projecting arms 56 that give the electronic circuit member 18 the star shaped configuration. Electrical contacts 58 are provided on the arms 56 of the circuit members 18. Electrically conductive connections 62 are provided between the electrical contacts of the adjacent circuit members, connecting the three circuit members in a series connection the last of which is connected to ground by ground straps 87. The three electronic circuit members 18 shown in the illustrated example are also connected with the electronic circuit board 48 for controlling illumination of the LEDs.

Each of the electronic circuit members 18 is removably mounted to the support casing 16 by being inserted between and engaging between a pair of the posts 42 that project outwardly from the rear wall 26. The base 54 of each electronic circuit member 18 engages against the rear wall 26, thereby enabling heat transfer from the base to the rear wall. The engagement of the pair of posts 42 with the opposite sides of the base 54 also conducts heat to the rear wall 26. The pairs of posts 42 removably hold the electronic circuit members 18 to the rear wall preventing movement of the circuit members across the surface of the rear wall. However, the positioning of each pair of posts 42 in the spacings between adjacent arms 56 of each circuit member base 54 enables the circuit members 18 to be easily removed from between the pairs of posts when replacement is needed by pulling the circuit members 18 away from the rear wall 26.

Figure 5:
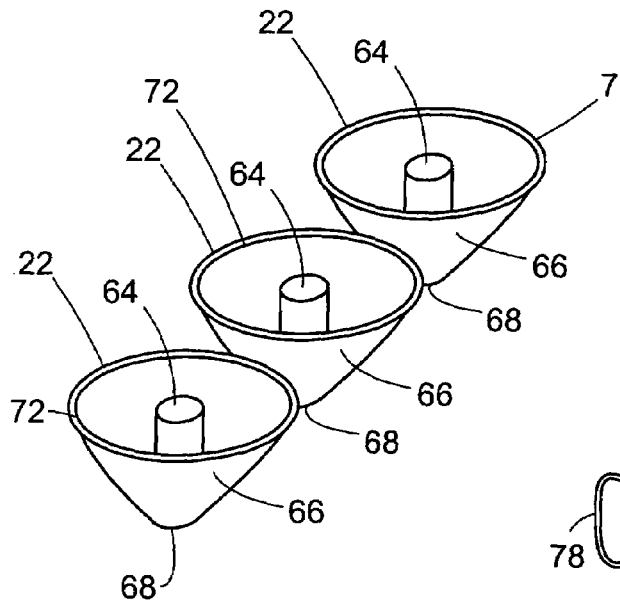
FIG. 5 is a perspective view of several of the optics of the LED assemblies.

A number of optics 22 corresponding to the number of circuit members 18 are mounted to the support casings 16. As seen in FIG. 5, each of the optics 22 has a general conical shape and comprises a focusing center lens 64 and a parabolic reflector 66 that surrounds the lens. A small recessed concave surface is provided at the apex 68 of each optic 22.

Each optic 22 has a circular edge 72 opposite the apex 68. The apex 68 of each optic 22 is positioned against the convex surface of the LED 52 of each of the electronic circuit members 18. This positions portions of the exterior surface of the optic 22 in one of the pairs of notches 34 formed in the side walls 28 of the support casings 16. The engagement of the concave surface at the optic apex 68 against the LED and the positioning of the optic exterior surface in the opposed pairs of notches 34 in the support casing side walls 28 positively positions each of the optics 22 adjacent its associated LED 52 in the support casing 16. This properly orients each of the optics 22 in the support casing 16 for focusing and projecting the light of each LED 52 outwardly from the support casing.

Figure 6:
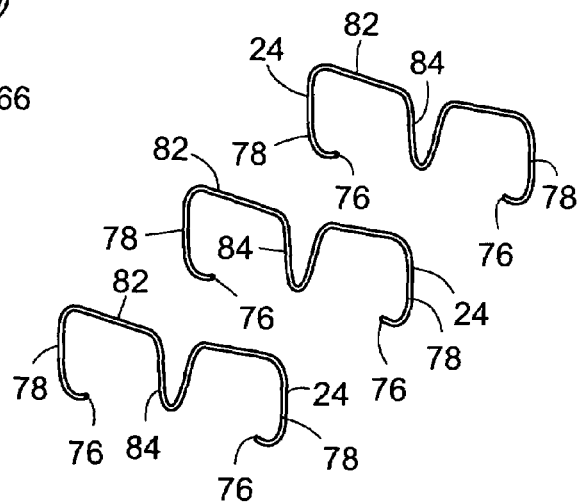
FIG. 6 is a perspective view of several of the spring braces that hold the optics and electronic circuit members to the support casing; and, FIG. 7 is a front perspective view of the apparatus removed from the motive source of FIG. 1.
Figure 7:
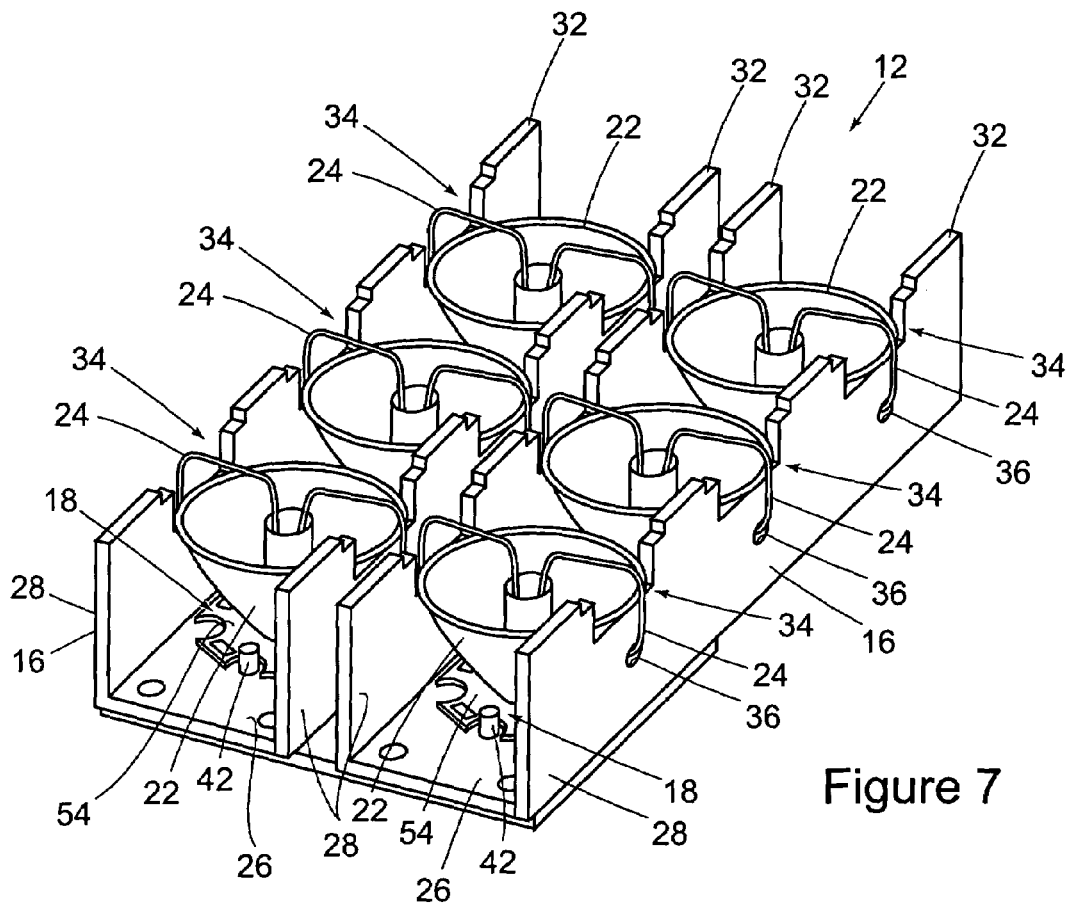

Each of the spring braces 24 shown in FIG. 6 is employed in removably holding each optic 22 and its associated electronic circuit member 18 to the support casing 16. The number of spring braces 24 employed corresponds to the number of optics 22 and the number of electronic circuit members 18 mounted to the support casing 16. As shown in FIG. 6, each spring brace 24 is a wire spring having a length with opposite in turned ends 76. The wire spring has a general U-shaped configuration. Side portions 78 of the spring wire extend parallel to each other from the in turned ends 76 to a middle portion 82 of the spring that connects the two side portions 78. A small center projection 84 is bent into the middle portion 82 of the spring. The flexibility and resiliency of the spring brace 24 enables it to be removably attached to the support casing 16 without the use of separate fasteners.

In assembling the apparatus of the invention, the series connected electronic circuit members 18 are first removably mounted on the support casing 18 by positioning each base 54 of a circuit member between a pair of post 42 on the support casing rear wall 26, as described earlier. The optics 22 are then mounted to their associated circuit members 18 by positioning the concave surface at each optic apex 68 against the convex surface of the LEDs 52 of the circuit members 18. Each spring brace 24 is then mounted over an optic 22 by flexing the opposite ends 76 of the brace away from each other and then positioning the opposite ends 76 over the support casing side walls 28 and into the holes 36 in the side walls. Releasing the spring braces 24 allows their resiliency to cause the spring brace ends 76 to removably engage in the holes 36. As each spring brace 24 is positioned over the support casing side walls 28, the center projection 84 of the spring brace extends into the optic lens 64. With the spring braces 24 in their positions shown in FIG. 7, the spring braces 24 solely removably hold the optics 24 and the electronic circuit members 18 to the support casing 16.

With the spring braces 24 removably holding the optics 22 against the electronic circuit member 18 and holding the electronic members 18 against the rear wall 26 of the support casing 16, the heat generated by the LEDs 52 is transferred from the base 54 of each electronic circuit member 18 to the support casing rear wall 26, dissipating the heat from the electronic circuit member 18 through the support casing 16. In addition, should one of the LEDs 52 fail, the electronic circuit member 18 of the failed LED can be easily removed from the support casing 16 by disengaging the opposite ends of the spring brace 24 from their engagement in the holes 36 of the casing side walls 28, and removing the spring brace 24, the optic 22 and the failed electronic circuit member 18 to enable replacement of the electronic circuit member.

The signal light supporting apparatus 12 described above provides a secure mounting for one or more of the LEDs 52 and their associated optics 22, and provides a removable attachment of the LEDs 52 and their optics 22 that enables easy replacement of a failed LED. The supporting apparatus 12 also functions as a heat sink providing a thermally conductive path for the individual LEDs to dissipate the heat generated by the LEDs and thereby maximize the light output and prevent the failure of the LEDs caused by excessive heat.

Although the apparatus of the invention has been described above by reference to a particular embodiment, it should be understood that modifications and variations could be made to the invention without departing from the scope of protection provided by the following claims.

What is claimed is:

1. A signal light supporting apparatus comprising:
    a support casing having a pair of walls with a spacing between the walls;
    a signal light optic positioned in the spacing between the pair of walls and engaging with both of the pair of walls;
    a spring brace removably attached to at least one of the pair of walls and engaging with the signal light optic, the spring brace removably holding the signal light optic in engagement with both of the pair of walls;
    the spring brace being removably attached to both of the pair of walls;
    the signal light optic having a concavity with an interior volume; and,
    the spring brace having a projection that projects into the concavity interior volume.

2. The apparatus of claim 1, further comprising:
    the spring brace solely removably holding the signal light optic in engagement with both of the pair of walls.

3. The apparatus of claim 1, further comprising:
    the spring brace extending across the spacing between the pair of walls and extending across the signal light optic positioned in the spacing.

4. The apparatus of claim 1, further comprising:
each of the pair of walls having a hole in the wall; and,
the spring brace having opposite ends with each end engaging in a hole in one of the pair of walls.

5. A signal light supporting apparatus comprising:
a support casing having a pair of walls with a spacing between the walls;
a signal light optic positioned in the spacing between the pair of walls and engaging with both of the pair of walls;
a spring brace removably attached to at least one of the pair of walls and engaging with the signal light optic, the spring brace removably holding the signal light optic in engagement with both of the pair of walls;
each wall of the pair of walls having a forward edge with a notch in the forward edge; and,
the signal light optic having an exterior surface with portions of the exterior surface extending into the notches in the pair of walls.

6. A signal light supporting apparatus comprising:
a support casing having a pair of walls with a spacing between the walls;
a signal light optic positioned in the spacing between the pair of walls and engaging with both of the pair of walls;
a spring brace removably attached to at least one of the pair of walls and engaging with the signal light optic, the spring brace removably holding the signal light optic in engagement with both of the pair of walls;
the signal light optic being one of a plurality of signal light optics that are each positioned in the spacing between the pair of walls and engage with both of the pair of walls; and,
the spring brace being one of a plurality of spring braces that each are removably attached to at least one of the pair of walls and engage with one of the signal light optics to removably hold the signal light optic in engagement with the pair of walls.

7. A signal light supporting apparatus comprising:
a support casing having a pair of walls with a spacing between the walls;
a signal light optic positioned in the spacing between the pair of walls and engaging with both of the pair of walls;
a spring brace removably attached to at least one of the pair of walls and engaging with the signal light optic, the spring brace removably holding the signal light optic in engagement with both of the pair of walls;
the support casing having a rear wall;
the pair of walls being a pair of side walls that project outwardly from the rear wall; and,
an electronic circuit member mounted on the rear wall adjacent the signal light optic.

8. The apparatus of claim 7, further comprising:
the electronic circuit member having a light emitting diode.

9. The apparatus of claim 7, further comprising:
a post projecting outwardly from the rear wall; and,
the electronic circuit member being mounted on the rear wall by engaging with the post.

10. The apparatus of claim 9, further comprising:
the post being one of a pair of posts that project outwardly from the rear wall; and,
the electronic circuit member being mounted on the rear wall by engaging between the pair of posts.

11. The apparatus of claim 1, further comprising:
the support casing being a heat sink.

12. A signal light supporting apparatus comprising:
a support casing having a rear wall with a plurality of pairs of posts projecting outwardly from the rear wall; and,
a plurality of electronic circuit members, each electronic circuit member having a light, and each electronic circuit member being independently removably mounted on the rear wall by engaging between a pair of posts.

13. The apparatus of claim 12, further comprising:
the rear wall being a heat sink.

14. The apparatus of claim 12, further comprising:
each light being a light emitting diode.

15. The apparatus of claim 12, further comprising:
the plurality of electronic circuit members being electronically connected in series.

16. The apparatus of claim 12, further comprising:
a plurality of optics with each light having an optic positioned adjacent the light.

17. The apparatus of claim 16, further comprising:
the support casing having a pair of side walls that project outwardly from the rear wall with a spacing between the pair of side walls;
the plurality of electronic circuit members being positioned in the spacing; and,
the plurality of optics being positioned in the spacing with each optic engaging between the pair of side walls.

18. The apparatus of claim 17, further comprising:
a plurality of notches in the pair of side walls; and,
each optic of the plurality of optics engaging in a pair of notches.

19. The apparatus of claim 17, further comprising:
a plurality of spring braces, each spring brace being removably attached to the pair of side walls in a position extending over an optic of the plurality of optics and thereby removably holding the optic in the spacing between the pair of side walls.

* * * * *